United States Patent [19]
Williams

[11] Patent Number: 4,822,223
[45] Date of Patent: Apr. 18, 1989

[54] WOOD INSERT

[76] Inventor: William L. Williams, HCR 06, Box 1571, Wetmore, Tex. 78163

[21] Appl. No.: 100,252

[22] Filed: Sep. 23, 1987

[51] Int. Cl.⁴ ............................................. F16B 39/02
[52] U.S. Cl. ........................................ 411/82; 52/705; 403/268; 411/178; 411/258; 411/427
[58] Field of Search ................. 411/82, 258, 177, 178, 411/69, 427; 52/705, 707, 784; 403/268, 266

[56] References Cited

U.S. PATENT DOCUMENTS

| | | | |
|---|---|---|---|
| 2,560,951 | 7/1951 | Henderson et al. | 52/705 |
| 2,855,970 | 10/1958 | Neuschotz | 151/23 |
| 3,016,578 | 1/1962 | Rohe | 411/82 X |
| 3,339,609 | 9/1967 | Cushman | 411/82 |
| 3,417,803 | 12/1968 | Rohe et al. | 411/177 X |
| 3,646,981 | 3/1972 | Barnes | 151/41.7 |
| 3,884,006 | 5/1975 | Dietlein | 411/82 X |
| 4,097,061 | 6/1978 | Dietlein | 411/178 X |
| 4,363,581 | 12/1982 | Pease | 411/82 |
| 4,440,534 | 4/1984 | LaBate | 411/82 |
| 4,554,196 | 11/1985 | Meeker | 428/67 |
| 4,630,971 | 12/1986 | Herbst et al. | 405/260 |

FOREIGN PATENT DOCUMENTS 970190  7/1975  Canada .................................. 411/178

Primary Examiner—Lloyd A. Gall
Assistant Examiner—Curtis B. Brueske

[57] ABSTRACT

An insert for securing a threaded object in a recipient material. The insert is formed from a cylinder-shaped body. The body has a threaded cavity at its first end for receiving a threaded object. A portion of the cylinder's exterior surface adjacent to the first end is threaded for placing the insert in a hole in the recipient material and then stabilizing the insert therein. Additional stability is provided by the interface of a flange on the cylinder's second end with an adhesive which is placed in the hole with the insert. The flange is formed by a circumferential recess near the cylinder's second end. The adhesive occupies the recess and, when it hardens and bonds to the recipient material adjacent to the recess, serves as an circular barrier abutting the inner boundary of the flange. The barrier prevents the insert from being pulled from the hole. The flange's perimeter is wave shaped for interfacing with the adhesive in the hole to anchor the insert against rotation which would tend to loosen the insert.

8 Claims, 1 Drawing Sheet

WOOD INSERT

BACKGROUND OF THE INVENTION

1. Field of the Invention.

The present invention relates to inserts for securing threaded objects in wood and similar recipient materials.

2. Description of the Prior Art.

Inserts for permitting finely threaded objects to be secured to materials which are not suitable for direct threaded engagement are known in the art.

The principle for all inserts is that an insert is designed to be attached to a recipient material in the manner most appropriate for the particular material and for engaging an object which could not be effectively attached directly to the material. The insert can, therefore, act as an intermediary between the object and the recipient material for providing the most effective possible attachment of the object to the material.

Examples of this principle may be seen in the following U.S. Pat. No. 2,855,970 issued to R. Neuscholtz, No. 4,363,581 issued to J. Pease, No. 3,646,981 issued to Barnes, No. 4,440,534 issued to LaBate, No. 4,554,196 issued to Meeker, No. 4,556,350 issued to F. Bernhardt, et al., and No. 4,630,971 issued to T. Herbst, et al.

Presently, inserts for attaching bolts and "metal screws" to wood and wood-like materials are in the form of metallic cylindrical objects having external helical threads and each having a threaded axially-oriented columnar cavity for receiving the bolt or screw. The external threads of each insert are shaped and arranged as would be the threads of a wood screw. The threads in the columnar cavity are sized and shaped for engaging the particular bolt or screw that is to be attached to the recipient material. The inserts provide durable threaded orifices into and from which threaded objects may be repeatedly moved without substantial thread disfigurement.

A shortcoming of presently available wood inserts is that they are no more resistant to being removed from the wood than a common wood screw, because, having only threads to engage the wood, they are anchored in the same manner as wood screws. Therefore, wood inserts are frequently pulled by acute force from the hole in which they are installed, or are unscrewed by torque transferred to the insert by repeated installation and removal of a threaded object from the insert's threaded columnar cavity.

To combat the problem of unintentional removal of wood inserts, inserts are sometimes glued into their holes. Because direct bonding between the insert's metal and the surrounding wood is not particularly effective, the problem remains in large part even when the wood insert is glued.

An example of accidental removal of inserts posing a costly and time consuming problem in industry is in aircraft refitting where cabinets and equipment are attached to lightweight wood panels using inserts. When an insert is accidentally pulled or unscrewed from its recipient hole, the panel must most often be replaced or a larger insert must be installed in the panel. Either way, significant time and expense is incurred for repair. The aircraft refitting industry in particular has long sought inserts which may be more reliably installed in wood panels.

It would, therefore, be desirable to design an insert for securing finely threaded objects to wood and wood-like materials, which insert would be designed for more effective anchoring against forces tending to separate it from its recipient material than presently-available inserts.

SUMMARY OF THE INVENTION

It is an object of the present invention to provide an insert for securing a threaded object to wood and wood-like recipient materials, which insert's design permits it to be more securely anchored to the recipient material than presently-available inserts.

It is another object of the present invention to provide an insert for securing a threaded object to wood and wood-like recipient materials which, when installed in a hole in the recipient material, will withstand greater axially-oriented force and torque without unintentional removal than presently-available inserts.

It is still another object of the present invention to provide an insert for securing a threaded object to wood and wood-like recipient materials which is more resistive to stripping from a hole in the recipient material than inserts having only external threads for anchoring in the recipient material.

It is yet another object of the present invention to provide an insert for securing a threaded object to wood and wood-like recipient materials which is designed for being concurrently anchored in a hole in the recipient material by external threads engaged in the recipient material, by a substantial barrier formed from hardened adhesive placed in the hole with the insert, and by the interface of an irregularly-shaped flange which is embedded in the adhesive.

These objects are satisfied by the present invention which teaches an insert formed from a single cylindrically-shaped metallic body. The insert comprises a flange at the body's first end, a circumferential recess in the body's exterior annular surface near the first end, and threads extending from the inner boundary of the recess to the body's second end. When the insert is threaded into a hole with a liquid adhesive therein, the recess permits a part of the adhesive to form into a circular barrier adhered to the recipient material adjacent to the recess and extending into the recess. Because the flange which is below the barrier in the hole cannot pass the barrier, the insert cannot be removed without force sufficient to completely break the adhesive barrier from the recipient material. Further securing the insert, the flange's periphery is altered to have a wave-like shape for interfacing with the adhesive and thereby preventing rotation of the insert which would tend to loosen the insert. The securing effect of the adhesive barrier and the interface of the flange and the adhesive augment that of the threaded engagement between the threads and the recipient material.

DETAILED DESCRIPTION OF THE PREFERRED EMBODIMENT

Figure 1:
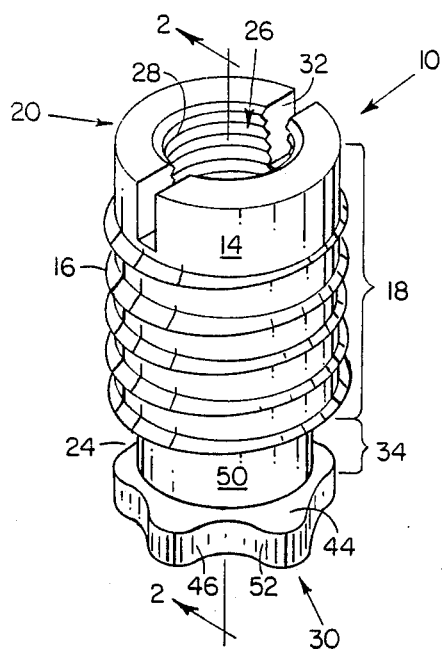
FIG. 1 is a perspective view of the preferred embodiment.

Referring to FIG. 1, the wood insert is referred to generally by the reference number 10. The insert 10 of the preferred embodiment is cylindrically shaped and is made of either brass, steel, or any other material such as may be used for wood screws (not shown).

It is noted that some applications would permit alternate embodiments of the insert 10 to be made from a plastic material such as polyvinylchloride (not shown). These applications would include use of the insert 10 in recipient materials like acoustical tile which would not require the hardness of metal for threading purposes.

Figure 2:
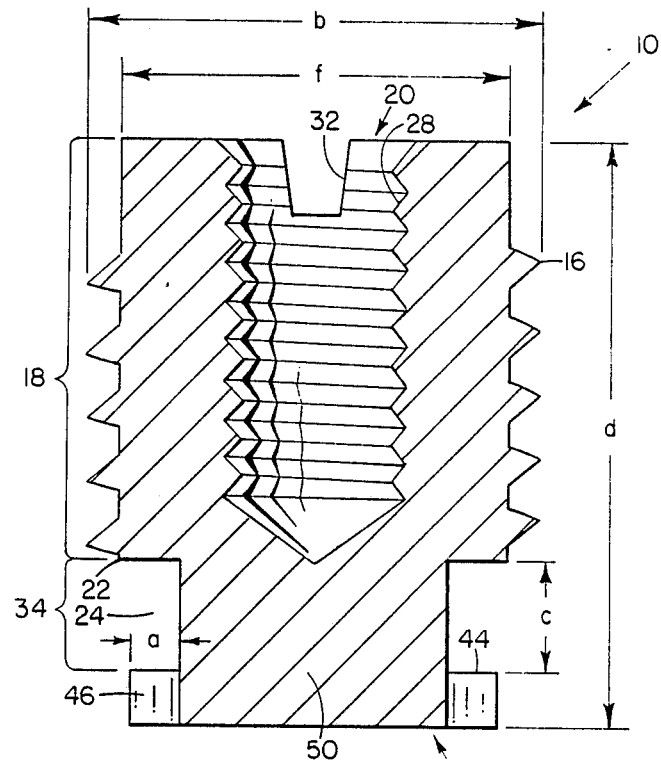
FIG. 2 is a cross section of FIG. 1 along line 2—2.

Referring to FIGS. 1 and 2 in combination, unlike present day inserts for use in wood, only a portion of the exterior annular surface 14 of the insert 10 has threads 16. This portion of the surface 14 (the first length 18) extends between the insert's 10 first end 20 and the inner edge 22 of a circumferential recess 24 in the insert's 10 exterior annular surface 14. The recess 24 will be discussed hereinafter.

The threads 16 are sharp, thin, and knife-like helical ridges for threadingly engaging wood (not shown in FIGS. 1 or 2) with a minimum of wood deformation. This permits wood between the threads 16 to retain the greatest possible integrity and, therefore, the greatest possible strength. The threads 16, by interfacing with wood at the annulus of a hole (not shown in FIGS. 1 or 2) in which the insert 10 is installed, serve to anchor the insert 10 in the hole. However, experience in industry, as discussed above, indicates more stability is required than the threads 16 alone can provide. As will be shown hereinafter, the combined features of the present invention provide the desired additional stability.

The insert 10 has a columnar cavity 26 which has internal threads 28 for engaging a threaded object (not shown). The columnar cavity 26 opens only to the insert's 10 first end 20 so nothing can enter the cavity 26 from the second end 30 as the insert 10 is installed thereby blocking the cavity 26.

A notch 32 is formed at the first end 20 and is perpendicular to the longitudinal axis of the insert 10. The notch 32 is for receiving the end of a standard screwdriver (not shown) by which the insert 10 may be screwed into a hole in a recipient material (not shown).

Figure 4:
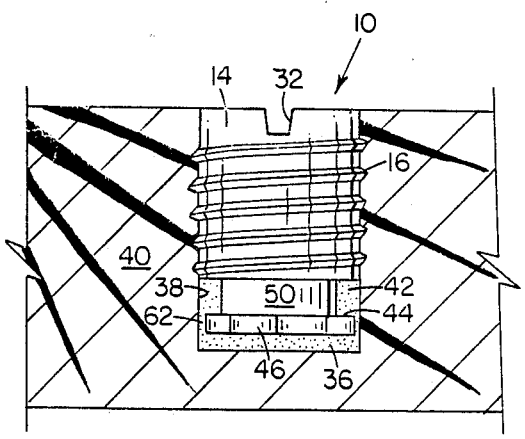
FIG. 4 is a depiction of the preferred embodiment installed in a recipient material.

Referring in combination to FIGS. 1, 2, and 4, a second length 34 of the insert's 10 exterior surface 14 is formed into a circumferential recess 24 near, but not at the insert's 10 second end 30.

The purpose of the recess 24 is to permit an adhesive 36 which is placed within a hole 38 in wood 40 before the insert 10 to act as a barrier to prevent removal of the insert 10. The adhesive 36 used in installing the insert 10 should be a resin or glue designed for use with wood 40. Such adhesives are, upon curing, more resilient than wood 40 and form bonds with wood 40 capable of withstanding more force than would be required to break the most types of wood 40. More particularly, the recess 24 provides an area in the hole 38 wherein a continuous annular rim 42 of adhesive 36 may form. When cured, the adhesive 36 forming the rim 42 is bonded to the wood 40 adjacent to the recess 24 and extends into the recess 24 from every radial direction. The inner boundary 44 of the flange 46 abuts this rim 42 and, because the flange 46 is too large to pass through the orifice (not separately shown) of the rim 42, the insert 10 cannot be removed from the hole 38.

Referring specifically to FIG. 2, the uniform depth (a) of the circumferential recess 24 relative to the exterior annular surface 14 on either side of the recess 24 should be approximately one fourth of the insert's 10 maximum diameter (b). Such a depth (a) will insure that an effective interface between the rim 42 and the recess 24 will form and that the shaft 50 of the insert 10 at the base of the recess 24 will not be reduced to the point of weakening it.

Referring in combination to FIGS. 2 and 4, the ideal width (c) of the recess 24 relative to the longitudinal length (d) of the insert 10 will be determined by the composite effect of: (1) the material in which the insert 10 is to be installed, (2) the need or lack of need for use of the insert 10 immediately after installation, and (3) the intended ultimate use of the insert.

If the insert 10 is to be installed in a soft, broad grain wood 40 which is substantially deformed and weakened as the external threads 16 bite into it, a relatively wide recess 24 would be desired so that a wide, stable rim 42 may form to compensate for the weakened wood 40 in resisting forces tending to pull the insert 10 from the hole 38. Conversely, when the insert 10 is to be installed in a hard, fine grain wood which retains much of its integrity notwithstanding damage caused by threads 16, a narrower recess 24 may suffice. An insert 10 in hardwood is less likely to be pulled from its hole 38 than it is to be simply unscrewed as torque is applied to it by repeated installation and removal of a threaded object (not shown). Therefore, a narrower, less substantial rim 42 will, for most purposes, adequately resist gradual removal of the insert 10 if it is caused to rotate.

Consideration must also be given to the use to which the insert 10 is to be put, both immediately after installation as well as into the extended future. If a significant load must be placed on the insert 10 immediately after installation to avoid significant production delays, a relatively large portion of the exterior surface 14 of the insert 10 may need to have threads 16 for holding the insert 10 in place until the adhesive 36 cures. Therefore, the recess 24 may, by necessity, be made relatively narrow. If no problems arise from delaying use of the insert 10 until the adhesive 36 cures, the forces which are to be exerted on the installed insert 10 after curing of the adhesive 36 are of more importance. In this case, and particularly if the insert 10 will ultimately have to withstand a substantial load, the recess 24 may need to be relatively wide to permit formation of a wide and very stable rim 42 to most effectively prevent the load from pulling the insert 10 from its hole 38. If the insert 10 is more likely to be removed through unscrewing under torque applied by the repeated installation and removal of threaded objects from the insert 10, and if substantial long-term or acute axial force is a lesser concern, the rim 42, and, therefore, the recess 24, may have a relatively small width (c).

Regardless of the respective effect of the above considerations, the width (c) should be no less than approximately one sixth of the body's 12 overall longitudinal length (d). A substantially lesser width (c) prevents the rim 42 from having adequate thickness and rigidity and from being adhered to a substantial cross sectional area of the wood 40 to perform a significant function regardless of the conditions.

Currently available inserts for wood having only external threads (not shown) lack any area where such a rim 42 may form because wood completely fills the area between threads. The only significant portion of adhesive 36 adjacent to an installed present day insert is at the bottom of its recipient hole (not shown). Because no adhesive 36 effectively bonds wood to metal and because no barrier independent of such bonding is formed, no stability is thus provided.

Notwithstanding the effectiveness of the rim 42 in preventing unintentional removal of the insert 10, it is important to note that an insert 10 having only a small shaft 50 and intervening flanges 46 on either end, therefore effectively relying solely on a rim 42 of adhesive 36 for stability, would lack the benefits of the present invention. Such a threadless insert (not shown), would lack means to properly direct the insert into a recipient hole (not shown) and hold it therein until the adhesive cures and would necessitate significant production delays relating to curing time for the adhesive 36 because no force whatsoever could be applied to the threadless insert until the adhesive 36 cures. Further, such an insert would be less resistant to forces tending to cause it to rotate in its hole (not shown), because it would lack the complimentary stabilizing effect of threads/wood interface.

Figure 3:
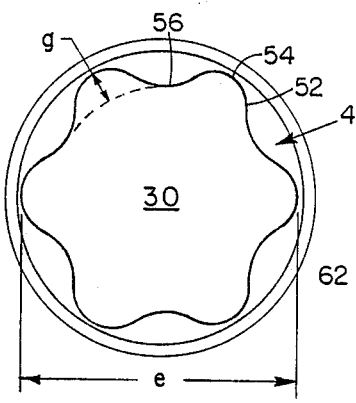
FIG. 3 is a plan view of the preferred embodiment viewed from its second end.

Referring in combination to FIGS. 2, 3 and 4, the flange's 46 perimeter 52, as viewed from the insert's 10 second end 30, is formed into a wave-like shape. The flange 46 has a maximum diameter (e) no larger than the smallest diameter (f) of the insert 10 along the insert's 10 threaded first length 18. This insures that the flange 46 will easily pass into a hole 38 which is just large enough to permit the insert 10 to be threaded into the hole 38 with the external threads 16 biting into the wood 40. Stated alternatively, no point on the flange's 46 perimeter 52 should extend radially further than the insert 10 at the corresponding radial point between the external threads 16.

The perimeter 52 of the flange 46 has its wave-like shape to permit an effective mechanical interface with an adhesive 36 in which the flange 46 is to be embedded when the insert 10 is installed in a hole 38 in wood 40. This arrangement produces a high degree of stability for the insert 10 against torque which would tend to rotate the insert 10 and thereby loosen it in its hole 38. Because of the wave-like shape of the perimeter 52, no two adjacent points of contact between the adhesive 36 are interchangeable. Consequently, all of the adhesive 36 along its line of contact with the flange's 46 perimeter 52 would have to be broken and deformed for the insert 10 to rotate in the hole 38. The stabilizing effect of this design could not be equaled by a design with a flange 46 having merely one or two flattened sides or indentations, because this would include large portions of non-convoluted perimeter 52 which could rotate without the necessity for any significant deformation of the surrounding adhesive.

Referring again to FIGS. 2, 3 and 4, to permit the most effective perimeter 52/adhesive 36 interface, the perimeter is shaped such that there are at least six wave crests 54 and six corresponding wave troughs 56. Further, the wave height (g) (the [vertical] radial distance between a wave crest 54 and an adjacent wave trough 56) should be neither substantially more nor substantially less than one eighth of the maximum diameter (b) of the insert 10. If the height (g) were substantially more than this (not shown), portions of the inner boundary 44 of the flange 46 would be effectively eliminated, this would eliminate the inner boundary's 44 contact with the rim 42 at the wave troughs 56, thereby reducing the effect of the rim 42 in stabilizing the insert 10. If the height were substantially less, the perimeter's shape would approach that of a smooth rounded form and no effective perimeter 52/adhesive 36 interface could form. Fewer than six waves couplets would also cause the perimeter 52 to approach a substantially smooth surface.

Figure 5:
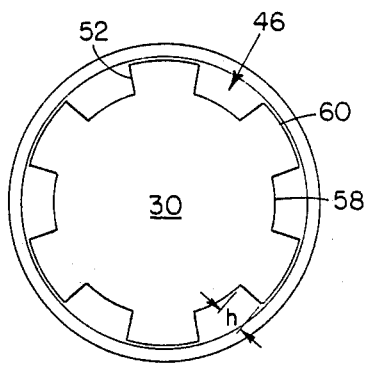
FIG. 5 is a bottom plan view of an alternative embodiment of applicant's invention wherein an alternative flange configuration is shown.

Referring to FIG. 5, if, because of costs or difficulties in producing the insert 10 having a flange 46 with the wave-like perimeter 52 are prohibitive, the next most effective form for the perimeter 52 would include a plurality of notches 58. There should be no less than six notches 58 and correspondingly six cogs 60 uniformly distributed over the perimeter 52. The notch height (h) should, like the minimum wave height (g) be at least one eighth of the insert's 10 maximum diameter (b) to ensure an effective interface between the perimeter 52 of the flange 46 and an adhesive in which the flange 46 is embedded when the insert 10 is installed.

The use of the preferred embodiment will now be discussed with particular reference to FIGS. 2 and 4. When the insert 10 is to be installed in wood 40 or a similar material (not shown), the hole 38 is drilled having a diameter slightly greater than the diameter of the flange 46 as described above and having a depth slightly greater than the length (d) of the insert 10. The particular diameter is to insure that the external threads 16 engage the wood 40 at the annulus of the hole 38. The particular depth is to insure that the flange 46 is embedded on all sides in the adhesive 36.

Before installing the insert 10, the adhesive 36 is placed in the hole 38. The adhesive 36 must be in a liquid or semi-liquid state before curing and must not require exposure to air to harden. A portion of adhesive 36 sufficient to fill the recess 24 and all the voids 62 defined by the wave troughs 56 should be placed in the hole 38.

After placing the insert's 10 second end 36 at the opening of the hole 38, using a screwdriver (not shown), torque is applied to the insert 10 by way of the notch 32 at the body's 12 first end 20. As the insert 10 turns in the appropriate direction according to the pitch of the external threads 16, the external threads 16 bite the wood 40 surrounding the hole 38 and draw the insert 10 into the hole 38. As the flange 46 nears the bottom of the hole 38, it presses against the adhesive 36. The adhesive 36 is forced through the voids 62 defined by the wave troughs 56 in the flange's 46 perimeter 52 to fill the recess 24. When fully installed, the flange 46 is embedded in the adhesive 36 at the hole's 38 bottom, and the recess 24 is filled with adhesive 36.

When the adhesive 36 is cured, the insert 10 is concurrently anchored in the hole 38 by the external thread 16/ wood 40 interface, by the rim 42/recess 24 interface, and by the flange perimeter 52/adhesive 36 interface. Test which compared the insert 10 with present day inserts lacking the recess 24 and a flange 46 having a wave-shaped perimeter 52 indicate that the insert 10 or the present invention, when installed as described above, withstands significantly greater torque and axial force than the present day inserts installed in the same material.

The preferred embodiment, therefore, teaches an insert having a truly synergistic combination of features which improves the insert's 10 resistance to accidental removal over all presently available inserts.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

I claim:

1. An insert for securing coupling means in a recipient material comprising:
   a body having a first end, a second end, and an exterior annular surface therebetween;
   a first portion of said body near said first end being formed into a recess for accommodating a first part of an adhesive placed in a hole in said recipient material with said insert and thereby allowing said first part to form a protrusion adhered to said recipient material adjacent to said recess at the inner surface of said hole and extending into said recess which protrusion, after said adhesive hardens, acts as a barrier resisting removal of said insert from said hole;
   a second portion of said surface extending from said second end to a point on said surface coextensive with the edge of said recess closest to said second end having first penetrating means for engaging said recipient material at said inner surface, said engaging means axially securing said insert in said hole;
   a third portion of said surface having a plurality of indentations, said indentations being sized and shaped whereby said third portion takes a wave-like shape, said shape of said periphery for interfacing with a second portion of said adhesive in which said third portion is embedded when said insert is installed in said hole having said adhesive placed therein, said indentations being sized such that there are six wave crests and six wave troughs on said periphery for providing an effective interface with said second portion of said adhesive, said wave crests and said wave troughs having a relative wave height of either substantially core nor substantially less than one eighth of said body's maximum diameter;
   said cylindrical body further having an axially-oriented columnar cavity at said first end, said cavity having second engaging means for engaging with said coupling means.

2. The invention of claim 1 wherein said first engaging means are first threads for threadingly engaging said recipient material at said annulus upon rotation of said insert in a first direction for directing said insert into said hole and thereafter securing said insert in said hole.

3. The invention of claim 2 wherein said second engaging means are second threads for engaging threaded coupling means.

4. The invention of claim 2 wherein said wave crests threads at no point along said periphery extend radially further than said body between said first threads at a comparable circumferential position on said body, thereby insuring that said flange may pass into said hole sized for engaging said first threads when said insert is installed in said hole.

5. An insert for securing a threaded object in a recipient material comprising:
   a cylindrical body of unitary construction having a first end, a second end, and an exterior annular surface therebetween;
   said cylindrical body having a circumferential recess in a first portion of said surface near said first end, said recess for accommodating a first part of an adhesive placed in a hole in said recipient material with said insert and thereby allowing said first part to form a rim adhered to said recipient material adjacent to said recess at an inner annulus of said hole and extending into said recess which rim, after said adhesive hardens, acts as a continuous circular barrier past which a flange formed at said first end by said recess cannot pass, thereby preventing removal of said insert from said hole;
   a second portion of said surface extending from said second end to the edge of said recess closest to said second end having first threads for threadingly engaging said recipient material at said annulus upon rotation of said insert in a first direction for directing said insert into said hole and thereafter further securing said insert in said hole;
   said flange's radial periphery having a plurality of indentations, said indentations being sized and shaped whereby said periphery takes a wave-like shape, said shape of said periphery for interfacing with a second portion of said adhesive in which said flange is embedded when said insert is installed in said hole having said adhesive placed therein, said indentations being sized such that there are six wave crests and six wave troughs on said periphery for providing an effective interface with said adhesive, said wave crests and said wave troughs having a relative wave height of approximately one eighth of said body's maximum diameter, and said flange at no point along said periphery extends radially further than said body between said first threads at a comparable circumferential position on said body, thereby insuring that said flange may pass into said hole sized for engaging said first threads when said insert is installed in said hole;
   said cylindrical body further having an axially-oriented columnar cavity at said second end, said cavity having second threads for interfacing with said threaded object.

6. The invention of claim 5 wherein said recess has a width parallel with the longitudinal axis of said body no less than one sixth of said body's overall longitudinal length, and a depth relative to said body on either side of said recess and perpendicular to said longitudinal axis approximately one fourth of said body's maximum diameter.

7. An insert for securing a threaded object in wood comprising:
   a metallic cylindrical body of unitary construction having a first end, a second end, and an exterior annular surface therebetween;
   a recess formed into said exterior annular surface near said first end, said recess having a depth from said annular surface approximately equal to one fourth of said body's maximum diameter and a width parallel with the longitudinal axis of said body no less than approximately one sixth of the longitudinal length of said body, said recess for accommodating a first part of an adhesive placed in a hole in said wood with said insert and thereby allowing said first part to form a rim adhered to said wood adjacent to said recess at the inner annulus of said hole and extending into said recess, which rim, after said adhesive hardens, acts as a continuous circular barrier past which a flange formed at said first end by said recess cannot pass, thereby preventing movement of said insert from said hole;

said flange's radial periphery being formed into a wave-like shape having at least six wave crests and wave troughs with a wave height equal to at least one eighth of said body's maximum diameter, said shape for permitting a mechanical interface between said periphery and a second part of said adhesive which is adhered to said wood adjacent to said periphery, said interface preventing rotation of insert in response to torque applied to said insert thereby further securing said insert in said hole, said periphery, between adjacent said wave crests, defining voids through which said first part of said adhesive may pass to fill said recess as said insert is installed into said hole;

a second portion of said exterior annular surface extending from said second end to the edge of said recess closest to said second end having first threads for threadingly engaging said wood at said annulus of said hole upon rotation of said insert in a first direction for directing said insert into said hole and thereafter securing said insert in said hole;

an axially-oriented columnar cavity at said second end, said cavity having second threads for engaging said threaded object;

said insert, when installed in said hole having said adhesive placed therein, being concurrently secured in said hole by said external thread's engagement with said wood at said annulus of said hole, by said rim formed from said first part of said adhesive filling said recess, and by said interface of said flange's wave shaped periphery with said second part of said adhesive; and said insert providing means for securing said threaded object in said wood against forces directed outward from said hole and forces exerting torque on said insert.

8. The invention of claim 7 wherein said flange's periphery has at least six wave crests and six wave troughs having a relative wave height of approximately one eighth of said body's maximum diameter.

* * * * *